(No Model.) 3 Sheets—Sheet 1.
A. L. RIKER.
DYNAMO ELECTRIC MACHINE OR MOTOR.
No. 518,768. Patented Apr. 24, 1894.
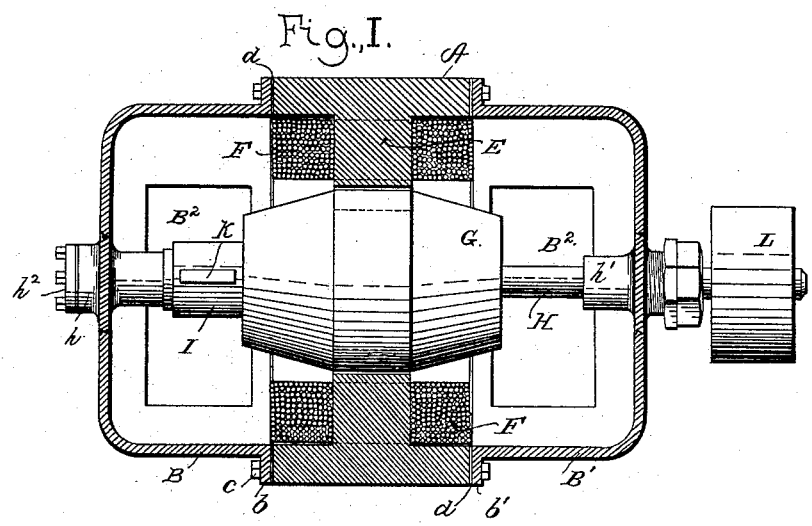
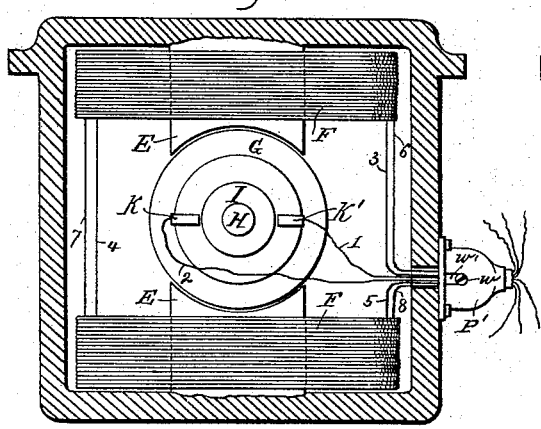
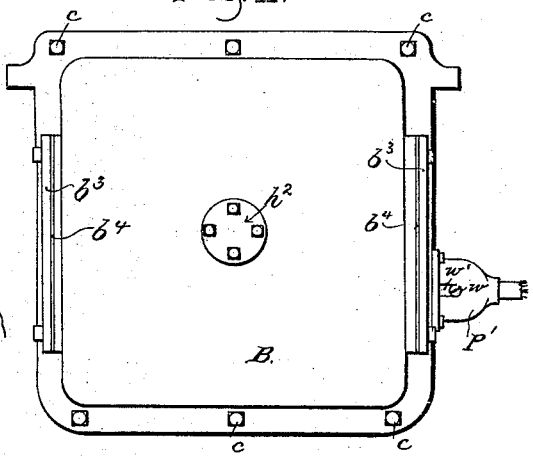
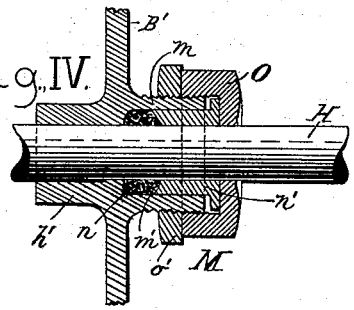
Witnesses,
W. R. Edelen,
Inventor,
Andrew L. Riker
by Pollok & Mauro
his attorneys.
THE NATIONAL LITHOGRAPHING COMPANY,
WASHINGTON, D. C.

(No Model.)   3 Sheets—Sheet 2.
A. L. RIKER.
DYNAMO ELECTRIC MACHINE OR MOTOR.
No. 518,768. Patented Apr. 24, 1894.
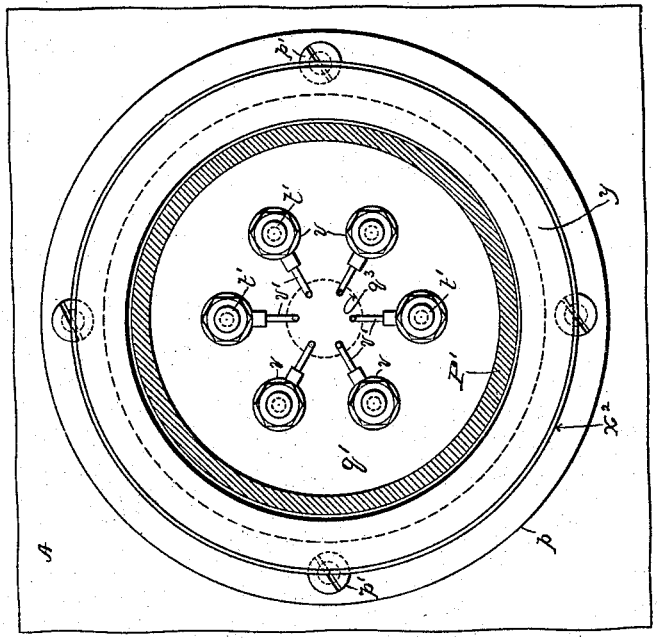
Fig. VI.
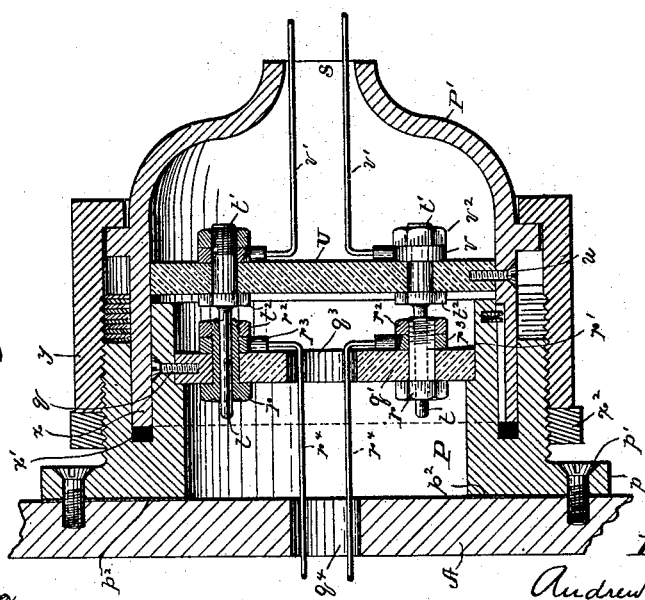
Fig. V.
Witnesses.
W. R. Edelyn
(signature)
Inventor,
Andrew L. Riker
by Pollok & Mauro
his attorneys
THE NATIONAL LITHOGRAPHING COMPANY,
WASHINGTON, D. C.

(No Model.) 3 Sheets—Sheet 3.
A. L. RIKER.
DYNAMO ELECTRIC MACHINE OR MOTOR.
No. 518,768. Patented Apr. 24, 1894.
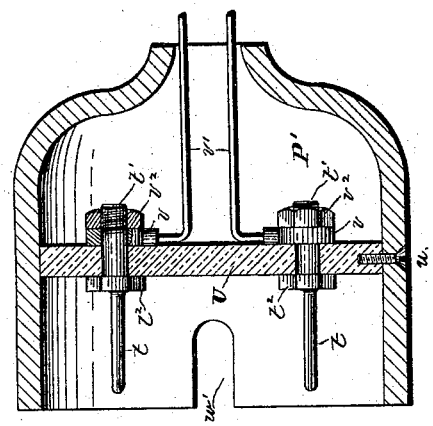
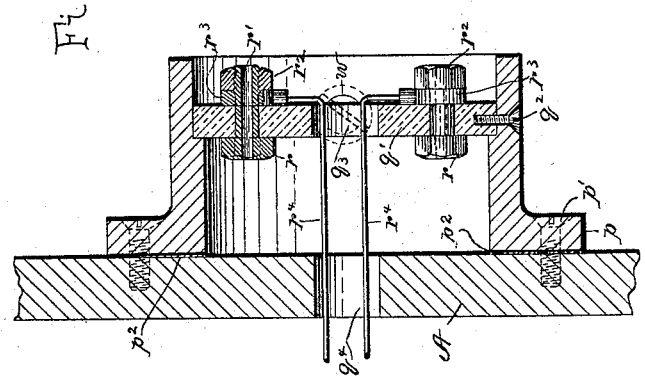
Fig. VII.
Witnesses.
W. R. Eddy
Reev. Lewis
Inventor,
Andrew L. Riker
by Pollok Mauro
his attorneys

UNITED STATES PATENT OFFICE.

ANDREW L. RIKER, OF NEW YORK, N. Y.

DYNAMO-ELECTRIC MACHINE OR MOTOR.

SPECIFICATION forming part of Letters Patent No. 518,768, dated April 24, 1894.

Application filed January 29, 1894. Serial No. 498,367. (No model.)

*To all whom it may concern:*

Be it known that I, ANDREW L. RIKER, of New York city, New York, have invented a new and useful Improvements in Dynamos or Motors, which improvement is fully set forth in the following specification.

This invention has reference to the construction of magneto-electric dynamos and motors, and particularly to machines designed to be used under conditions where it is necessary to render them by some means tight against access of gas, water and dust.

The main object of the present invention is to avoid the necessity of employing, in such cases a separate casing, cover or inclosure by constructing a dynamo or motor which shall be complete in itself, that is to say a dynamo or motor in which some of the parts of the machine, while retaining their functions in the operation thereof, constitute at the same time the casing or inclosure for the working-parts, wires, terminal connections, &c. Incident to such construction there is a great reduction in the cost and weight of the machine, and other advantages are attained as will be apparent from the detailed description hereinafter given.

The invention also includes various features, elements and constructive details, as will hereinafter more fully appear.

The invention, when embodied in what is deemed the best form is carried out by constructing a dynamo or motor in three parts or sections, viz: the middle or magnetic section (of ring form which also includes frames of rectangular shape) constituting the magnetic circuit or field-magnet of the machine, and two cap sections secured to opposite sides or faces of the middle or magnetic section, having bearings formed therein in which the armature axle is journaled.

Another important feature resides in the construction of a terminal block whereby the metallic circuit or circuits to the interior of the machine are opened and closed with ease and accuracy and without permitting the admission of gas, water or dust thereto.

In the accompanying drawings is illustrated, what I consider the best embodiment of my invention in a practical machine of the two-pole type (it being equally applicable however, to machines employing a larger number of poles), in which—

Figure I is a vertical longitudinal section through the machine. Fig. II is an end view from the left of Fig. I. Fig. III is a diagrammatic view, the magnetic section being shown in transverse section, illustrating the circuit connections within the machine, and Fig. IV is a detail sectional view of the stuffing box around the armature shaft at one end. Fig. V is a sectional view of an improved terminal block, only two of the terminal sockets and pins being shown. Fig. VI is a plan view of the terminal block, a portion of the outer end of the casing being omitted to show the connections with the contact pins, and Fig. VII is a sectional view of a terminal block, in which the packing rings and clamping sleeve are omitted, the sections of the block as illustrated being separated, and the circuit connections therefore broken.

Referring to Figs. I, II, III and IV, I will first describe that portion of my invention which relates more particularly to the construction of the dynamo or motor.

In the figures A represents the middle or magnetic section, made of any suitable magnetic material and B, B' the two cap sections, of a material not necessarily magnetic, which may conveniently be made cup shaped, have outwardly projecting flanges $b$, $b'$ at their outer edges respectively, through which bolts $c$ pass to secure the cap sections to the magnetic section A. In order to form gas and water tight joints between the sections, suitable packing $d$ is interposed between the meeting edges thereof. The magnetic section A has inwardly projecting pole pieces E formed integral therewith, around which are placed exciting helices F.

G is the armature of any suitable type, mounted upon axle H.

I is the commutator and K, K' are the brushes.

The axle H is journaled at its ends in bearings $h$, $h'$ respectively in cap sections B, B', the bearing $h$ in the section B being made water and gas tight by a cover $h^2$. The axle extends through the bearing $h'$ and carries at its outer end a pulley L, to which power is transmitted to drive the armature when the machine is used as a dynamo and from which power is transmitted when the machine is employed as a motor. Openings $B^2$ are formed in the opposite sides of sections B and B', and provided with gas and water tight covers $b^3$ having interposed packing $b^4$ through which access can be had to the brushes, commutator and other parts for purposes of repair or adjustment.

A water and gas tight stuffing box M (shown in detail in Fig. IV) encircles the axle H where the latter projects through the cap B'. In constructing the stuffing box I form a hub $m$ on the section B' (which may be accomplished in casting the latter) around the axle, said hub having recess $m'$ in its end and being exteriorly screw threaded. Packing $n$ is placed in the recess so as to fit close around the axle, and is compressed by a sleeve which is forced into the recess by a clamping ring O. The clamping ring O has an interior screw-thread, which engages the exterior thread on the hub $m$, and at its outer end engages against the compressing sleeve $n'$. Set-nut $o'$ serves to hold the clamping ring in its adjusted position.

It is evident that in a dynamo or motor of the type herein described which is in effect completely sealed, the circuit connection from the interior to the outside of the machine must be effected in such manner as to prevent the admission of water or gas where the metallic circuits or wires pass through the casing. In order to accomplish this result in a successful manner I have devised an improved terminal block which is composed of two separable parts, a stationary part or base and a removable part or cover. The wires of the internal circuits terminate in the stationary part in terminal sockets, and the wires of the external circuit terminate in pins on the removable part or cover, which pins project into the socket making electrical contact therewith when the parts of the block are brought together. Means are also provided whereby the parts are prevented from being put together except in a certain relative position, so that each pin will enter its corresponding socket, otherwise in some instances, in assembling the parts a negative pin might be introduced into a positive socket and vice versa.

My improved terminal block is fully illustrated in Figs. V, VI and VII referring to which P represents the stationary part or base and P' the removable part, cap or cover which will hereinafter be termed the cover in order to distinguish from the cap sections of the dynamo or motor. The base P is provided with a flange $p$ through which screws $p'$ are passed to secure part P to the magnetic section, insulating packing $p^2$ being interposed to insure a tight joint. Upon the inner face of the base is formed a shoulder or offset $q$ against which rests the plate $q'$ of suitable insulating material, slate being preferred, said plate being secured in place by screw $q^2$ passing through the base P into the edge thereof. This plate serves as the support for the terminal sockets to which the wires from the interior of the machine are connected. These terminal sockets are arranged around a central opening $q^3$ beneath which is a corresponding opening $q^4$ through the magnetic section A. Each terminal socket consists of a bolt $r$ passing through an opening in the plate $q'$ having a longitudinal aperture $r'$ into which a contact terminal pin on the removable section projects and makes electrical contact. The bolt $r$ is held in place by a nut $r^2$ engaging a screw thread at one end thereof. Around the bolt (making electrical contact therewith) beneath the nut is a close fitting washer $r^3$ to which the end of the wire $r^4$ from the interior of the machine, passing out through openings $q^3$ and $q^4$, is directly connected. Any required number of these terminal sockets may be provided, only two being illustrated in the drawings. The cover P' has a contracted opening $s$ at its outer end through which the conductors pass in cable form, branching to their respective terminal pins inside of the cover.

Each terminal pin consists of a shank $t$, a screw threaded head $t'$ and a shoulder $t^2$ below the head. An insulating supporting plate U (preferably of slate) is secured in the cap P' by screws $u$ forming a partition therein. The head of each contact pin is passed (from the open end of the cover) through an opening in the plate U until the shoulder $t^2$ rests against the latter. Washer $v$ directly connected to one of the branch wires $v'$ makes electrical contact around the head of the pin, the latter being tightly held in place by nut $v^2$ engaging the screw threaded head $t'$ above the washer $v$. After the proper connections are made the space in the cover above the plate is filled with suitable insulating material. Upon the base P is a pin $w$ which enters a slot or recess $w'$ in the edge of the cover before the latter can be slipped in place over the base, and unless the parts are brought together in such relative position no contact will be made between the terminal pins and the sockets.

In the terminal block illustrated in Fig. V which is water and gas tight, the base P is exteriorly screw threaded and has a recess $x$ in its outer end which serves to receive suitable packing $x'$, the latter being engaged by the inner end of cap P' projecting into the recess $x$ to form a tight joint. The cap is tightly held to its seat by an interiorly threaded clamping sleeve $y$ which is screwed onto the exterior thread of the base P, having a set nut $x^2$ said sleeve engaging a shoulder or flange on the outer face of cover P'. The arrangement of terminal block as shown in Fig. VII is designed to be dust tight only.

Referring to the diagrammatical view Fig. III, I have illustrated the connections inside of the machine, wherein 1, and 2 represent the wire conductors for the brushes K, K', 3, 4 and 5 are conductors for the shunt coils, and 6, 7 and 8 are conductors for the series coils both the shunt and series coils being located in spools F, F. The wires 1, 2, 3, 5, 6 and 8 connect with sockets in the base of the terminal block as above described.

From the foregoing description the operation of my improved dynamo or motor can be readily understood by those familiar with the art.

It will also be obvious that different embodiments of my invention may be made without departure from the principle thereof.

The terminal block herein described although designed and particularly applicable for use in connection with dynamos or motors of the type set forth, is not limited to such use.

What I claim as my invention is—

1. In a dynamo or motor comprising as an integral part of its structure a sealed casing or inclosure, the combination with a magnetic section and cap sections secured to the sides of said magnetic section, of a terminal block consisting of a cover and a base or stationary part, the latter being secured to one of the sections comprising the casing, substantially as described.

2. In a dynamo or motor a terminal block for the electrical conductors, comprising a base or stationary part and a cover or removable part, terminal sockets on one part and terminal pins on the other adapted to make electrical contact in the sockets when the cover is placed over the base, substantially as described.

3. A terminal block for electrical conductors, comprising a base or stationary part and a cover or removable part, terminal sockets on one part, terminal pins on the other adapted to make electrical contact in the sockets when the cover is placed over the base, and insulating supporting plates on the cover and base for the sockets and pins, substantially as described.

4. A gas and water tight terminal block comprising a base and a cover adapted to fit over said base, packing interposed in the joint between said parts and means for clamping the parts together, substantially as described.

5. A gas and water tight terminal block comprising a base having a recessed outer end, packing in said recess, a cover the inner edge of which projects into the recess against the packing, a clamping ring or sleeve embracing the juncture of the cover and base and by means of which these parts are drawn together, substantially as described.

6. The combination with a casing having an opening therein, of a gas and water tight terminal block comprising a base and a cover, the former being secured to the casing over the opening, packing interposed at the joint between the base and casing, conductors passing from the interior of the casing through the opening therein, contact devices on the base, conductors passing through one end of the cover to contact devices corresponding to those on the base, and means for making a gas and water tight joint between the cap and base, substantially as described.

7. In a terminal block comprising a base and a cover, terminal pins on one part and terminal sockets on the other in which said pins make electrical contact, and means for preventing such contact except in certain relative positions of the cover and base, substantially as described.

In testimony whereof I have signed this specification in the presence of two subscribing witnesses.

ANDREW L. RIKER.

Witnesses:
THOS. L. PROCTOR,
W. L. BLISS.